Feb. 9, 1971     W. HACHTEL     3,561,037
SAFETY CURTAIN HANGER
Filed July 16, 1968     2 Sheets-Sheet 1

*INVENTOR.*
WILHELM HACHTEL

Feb. 9, 1971   W. HACHTEL   3,561,037
SAFETY CURTAIN HANGER
Filed July 16, 1968   2 Sheets-Sheet 2

INVENTOR.
WILHELM HACHTEL

United States Patent Office 3,561,037
Patented Feb. 9, 1971

3,561,037
SAFETY CURTAIN HANGER
Wilhelm Hachtel, 6994 Niederstetten, Germany
Filed July 16, 1968, Ser. No. 745,228
Claims priority, application Germany, July 25, 1967,
H 63,385
Int. Cl. A47h *13/04*
U.S. Cl. 16—87.2         9 Claims

ABSTRACT OF THE DISCLOSURE

A resilient clip-type curtain hanger having a slot at its free clip end which engages at top and bottom a pair of oppositely directed hooks extending from the supporting portion of the hanger. The distance between the engaging faces of the hooks is greater than the length of the slot and the hooks can be flexed together somewhat to enter the slot.

---

This invention relates to a safety hanger for curtains and the like and more particularly to a clip-type hanger having a clip portion with means for closing and/or force-transmitting engagement with a support portion.

Known safety hangers of this type use the load of a curtain to prevent the clip from disengaging. In addition, the clips are given an initial stress so that the end of the clip is retained to a certain degree even in the absence of the curtain load. In order to obtain this initial stress, the clip must have a certain rigidity which requires among other things a certain minimum thickness and minimum amount of material. Nevertheless, on occasion the end of the clip will still become disengaged.

It is the object of the invention to provide a safety hanger which cannot accidentally disengage.

Another object of the invention is to provide a safety hanger wherein considerable material savings are achieved.

These objects are satisfied in the present invention in which a second means for closing and/or force-transmitting engagement is provided between the clip and the hanger support, spaced from the free end of the clip which can be locked oppositely to the tension direction in a first closing and force-transmitting engagement.

Advantageously, the loop of the hanger can be very thin and easily twistable. When the clip is very thin it better fits the suspension loops on the curtain, material is saved and the clip is easier to open and close.

It is also an advantageous feature that the first means of engagement between the clip and the hanger support is separated from the second means of engagement. This enables the portion of the clip as well as the portion of the support between the first and the second engagement positions to be resilient and imparts resiliency to the engagements themselves. The greater resilient length can be associated either with the clip or with hanger support or with both.

It is also advantageous that an engaging slot on the clip can open in its untwisted state in the direction of the tool used for the production of the other portions of the hanger. In this way, the safety hangers can be very easily injection-molded because the tools need only be moved in one direction. The sliding tools which must be normally provided for slotted lugs can be eliminated.

It is also an advantageous feature that engaging hooks are provided on the support to engage at the top and bottom of the slot and that both hooks point in opposite directions. In this way, we obtain a particularly safe and easy to mold counterpiece to the slotted clip. The slot is also stretched within certain limits so that the spring properties of the hanger are increased.

It is also an advantageous feature that the distance between engaging hook faces is greater than the distance between the the engaging slot faces. The clip can thus always be kept under the necessary tension. Special adjusting devices are not necessary.

Preferably at least one of the hooks and/or the slot has at a respective point a bevel for sliding into engagement. It is then only necessary to hang a slotted end of the clip on one hook and to slide it on the other hook by a slight pressure until it locks completely.

It is an advantageous feature that the first engagement is provided at the free end of the clip by a first thickening and a cooperating seat in the hanger support and that the second engagement is provided by a second thickening which can be locked in a second seat oppositely directed to the first seat. Such hangers require no familiarization by the user who is already familiar with hangers having means similar to that provided for the first engagement.

It is also an advantageous feature if the two thickenings are joined by a relative thin clip portion. This thin portion yields easily during the engagement since it is flexible and facilitates the engagement. It has, on the other hand, sufficient strength to carry the curtain load and to increase the locking force. It also saves material.

These and other objects, advantages and features of the invention will be readily understood from the following detailed description taken together with the drawings in which.

Figure 1:
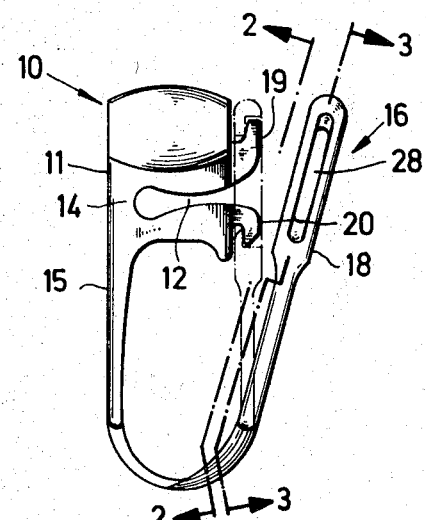
FIG. 1 is a side view of a sliding hanger whose clip is open and relaxed.
Figure 2:
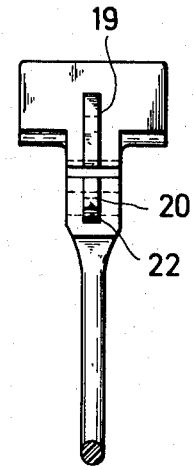
FIG. 2 is a sectional view taken along line 2—2 in FIG. 1.
Figure 3:
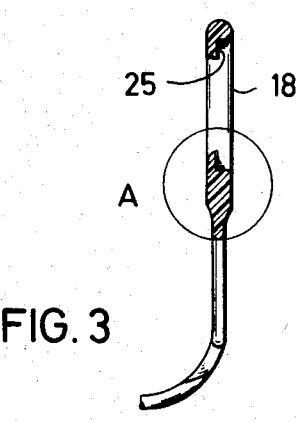
FIG. 3 is a sectional view taken along line 3—3 in FIG. 1.
Figure 4:
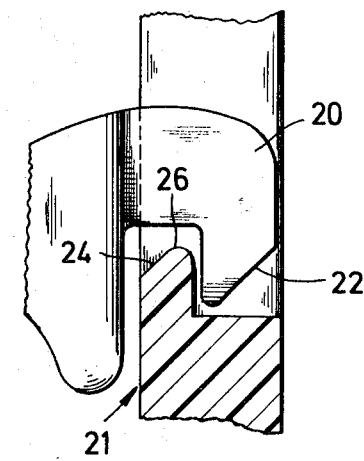
FIG. 4 is an enlarged representation of area A in FIG. 3 in which the lug end of the clip is engaged.

Referring to FIGS. 1–4 a safety hanger 10 has a support 11 which has an open-ended slot 12 whose left end is terminated by a connecting portion 14. A clip 15 extends from the area of the connecting portion and is relatively thin over its entire length compared to the usual hanger clips. Its free end 16 is in the form of a slotted lug 18, which can be engaged with two hooks 19 and 20 on the support 11. The engagement between hook 19 and the upper portion of slotted lug 18 will be stressed in tension while the engagement shown generally at 21 (FIG. 4) between hook 20 and the lower portion of the slotted lug 18 will be stressed oppositely.

The distance between the supporting faces of the hooks 19, 20 is less than the distance between the opposed supporting faces on the slotted lug 18 so that slot 12 is squeezed narrower when the clip is engaged as indicated by broken lines in FIG. 1. As a result, a locking tensile stress is set up in the two longitudinal legs of slotted lug 18.

In use, slotted lug 18 and the part of the clip 15 directly connected with it are so turned that the bevels 22, 24 oppose each other. Then the upper edge 25 of slotted lug 18 is engaged on hook 19 and slotted lug 18 is pressed at its lower portion against hook 20. The bevels 22, 24 slide along one another and the lower edge 26 of slotted lug 18 engages hook 20. In operation the supporting hook faces bear against the supporting slotted lug faces. Because of the form of the upper engagement, there is the additional advantage that force of engagement increases automatically when the stress increases.

The safety hanger is generally made of plastic. A special advantage of the safety hanger according to FIGS. 1–4, is it can be injection-molded in the form shown in FIG. 1. In such case, an injection-molding tool of two molding plates is sufficient. The plates are moved perpendicularly to the drawing plane, after the safety hanger has been molded. The slot 28 in the lug 18 can be produced in this way. In operating position, the slot axis is parallel to the plane of the drawing and normally a separate tool which can be moved parallel to the drawing plane, is required.

Figure 5:
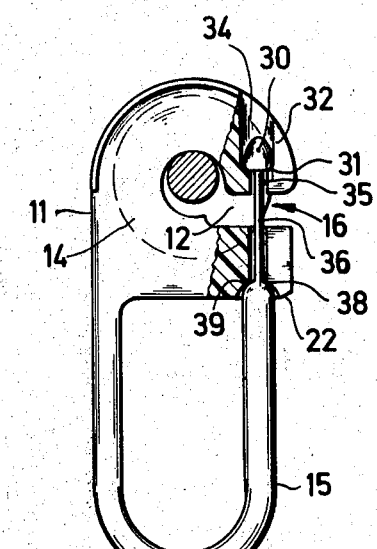
FIG. 5 is a side view of a second embodiment of a hanger according to the invention partly in section.
Figure 6:
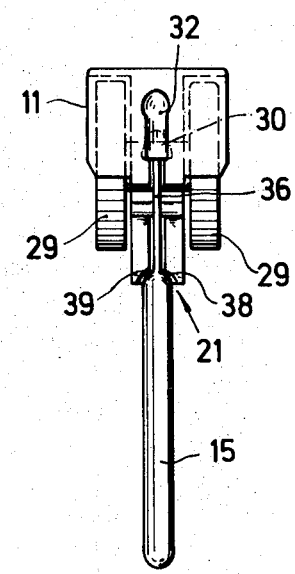
FIG. 6 is an end view of the second embodiment.

Referring to FIGS. 5 and 6, a second embodiment of the invention has a free end 16 of clip 15 which can be engaged and disengaged in the direction of motion of roller 29. A thickened end portion 30 is provided at the free end 16, which locks into a seat 31. A slot 32, an open-edged inlet duct 34 and passage duct 35 are provided in the support 11. A relatively thin clip piece 36 joins the end portion 30 to the rest of the clip 15.

Here, as in the first embodiment, a slot 12 and a connecting member 14 (which is somewhat wider in this embodiment) is provided.

At the bottom end of clip piece 36, a thickening 38 is provided which locks into a seat 39 in the support 11.

In use, the thickened portion 30 is engaged in seat 31. Then the area around the bottom end of the clip piece 36 is pushed toward support 11 so that thickening 38 slides along bevel 22 on support 11 and locks in the dimpled seat 39. The slot 12 becomes slightly narrowed and clip piece 36 is subjected to tensile stress as a result.

Figure 7:
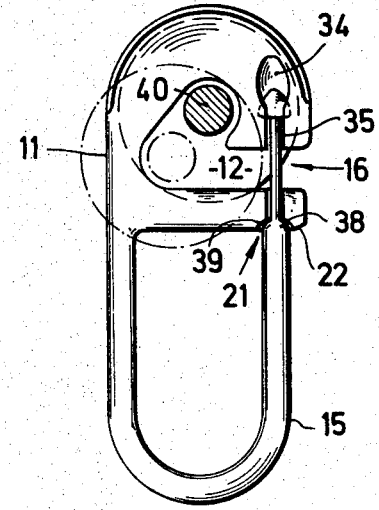
FIG. 7 is a side view of a third embodiment of a hanger according to the invention.

Referring to FIG. 7, the end 16 of clip 15 can be engaged from the side of the hanger and the roller axis 40 can be so displaced in slot 12 so that the clip end 16 is free for engagement in the duct 34, while the roller provides additional covering and security against disengagement.

Figure 8:
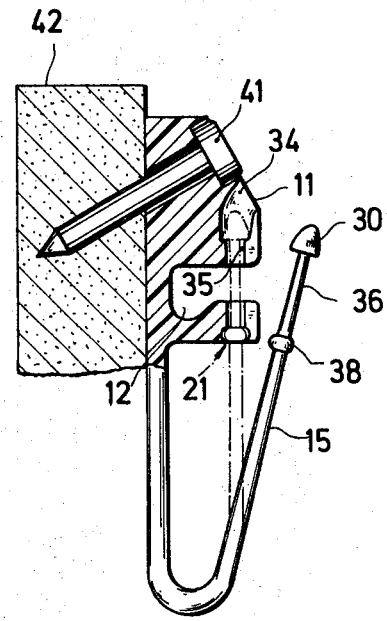
FIG. 8 is a side view of a fourth embodiment of a hanger according to the invention partly in section.

Referring to FIG. 8, clip 15 is again thinner, for example, than in the embodiment according to FIGS. 5–7. The thickening 38 is offset on clip 15. The support 11 is secured on a wall 42 by a nail 41. Instead of the nail 41, the support 11 can also be glued on the wall 42.

This invention has been described in terms of specific embodiments. However, it should be understood that these embodiments are descriptive only and that modifications and departures may be made therein without departing from the spirit or teaching of the invention.

What is claimed is:

1. A safety hanger for curtains and the like comprising a support portion and a clip portion at least one end of which is releasably connected to the support portion by cooperating connection means on the respective portions, the connection means collectively defining a first pair of engaging surfaces which engage in a direction to resist the curtain weight and pulling stresses, and a second pair of engaging surfaces which are brought into engagement by stressing the support portion in a direction opposite to the direction of application of the curtain weight and pulling stresses, the distance between said engaging surfaces belonging to said support portion of each pair being resiliently variable.

2. A safety hanger as claimed in claim 1 wherein the clip portion is sufficiently thin to be easily twisted.

3. A safety hanger as claimed in claim 1 wherein the support portion comprises a web and a pair of limbs extending from the web and separated by a slot, the outward facing surfaces of the limbs defining the engaging surfaces of the support portion.

4. A safety hanger as claimed in claim 3 wherein the end of the clip portion is provided with connection means comprising a lug having an opening which, in the extended non-twisted condition of the clip portion, lies in the plane of the limbs.

5. A safety hanger as claimed in claim 3 wherein each said limb terminates in a hook, the hooks being directed oppositely and outwardly and the end of the clip portion is provided with an opening therein.

6. A safety hanger as claimed in claim 5 wherein the opening of the clip is adapted to engage over the hooks, the maximum separation of the outwardly directed hook surfaces being greater than the corresponding dimension of the clip opening.

7. A safety hanger as claimed in claim 5 wherein the clip opening is adapted to engage over the hooks and wherein at least one bevelled edge surface is arranged to assist the action of engagement of the hooks and the clip.

8. A safety hanger as claimed in claim 3 wherein the limbs are slotted to receive the end of the clip portion and the outward surfaces of the limbs each has a recess, the clip portion being formed with enlargements adapted to seat in said recesses.

9. A safety hanger as claimed in claim 8 wherein said enlargements are interconnected by a length of the clip portion which is thinner than the main part of the clip portion.

References Cited

UNITED STATES PATENTS

| | | | |
|---|---|---|---|
| 618,557 | 1/1899 | Brewington | 16—87.2 |
| 2,417,623 | 3/1947 | Yellin | 16—87.2 |
| 2,551,384 | 5/1951 | Middleton et al. | 16—87.2 |
| 2,897,535 | 8/1959 | Radler | 16—87.2 |
| 3,007,666 | 11/1961 | Hamel | 24—237X |
| 3,055,400 | 9/1962 | Frappe | 24—237X |

FOREIGN PATENTS

| | | | |
|---|---|---|---|
| 1,355,720 | 2/1964 | France | 16—87.2 |
| 4,393 | 6/1910 | Great Britain | 24—237 |

JAN A. CALVERT, Primary Examiner

U.S. Cl. X.R.

24—73, 237